United States Patent
Purcarea et al.

(10) Patent No.: US 10,608,555 B2
(45) Date of Patent: Mar. 31, 2020

(54) INVERTER CIRCUIT COMPRISING A CIRCUIT ARRANGEMENT FOR REGENERATIVE DAMPING OF ELECTRICAL OSCILLATIONS, AND METHOD FOR REGENERATIVE DAMPING OF ELECTRICAL OSCILLATIONS

(71) Applicant: Robert Bosch GmbH, Stuttgart (DE)

(72) Inventors: Calin Purcarea, Stuttgart (DE); Thomas Peuser, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/752,403

(22) PCT Filed: Jun. 17, 2016

(86) PCT No.: PCT/EP2016/063980
§ 371 (c)(1),
(2) Date: Feb. 13, 2018

(87) PCT Pub. No.: WO2017/028989
PCT Pub. Date: Feb. 23, 2017

(65) Prior Publication Data
US 2019/0006958 A1 Jan. 3, 2019

(30) Foreign Application Priority Data
Aug. 20, 2015 (DE) .................. 10 2015 215 886

(51) Int. Cl.
*H02M 7/5387* (2007.01)
*H02M 1/34* (2007.01)

(52) U.S. Cl.
CPC ......... *H02M 7/53875* (2013.01); *H02M 1/34* (2013.01); *H02M 7/5387* (2013.01); *H02M 2001/342* (2013.01); *Y02B 70/1491* (2013.01)

(58) Field of Classification Search
CPC .. H02M 1/08; H02M 7/5387; H02M 2001/48; H02M 2001/0051;
(Continued)

(56) References Cited

U.S. PATENT DOCUMENTS 5,982,646 A * 11/1999 Lyons ..................... H02M 1/34
363/128
6,219,265 B1 * 4/2001 Bernet .................. H02M 7/487
363/137

(Continued)

FOREIGN PATENT DOCUMENTS

CN 104092363 A 10/2014
CN 104578877 A 4/2015
(Continued)

OTHER PUBLICATIONS

International Search Report for Application No. PCT/EP2016/063980 dated Sep. 27, 2016 (English Translation, 2 pages).

*Primary Examiner* — Gustavo A Rosario-Benitez
(74) *Attorney, Agent, or Firm* — Michael Best & Friedrich LLP

(57) ABSTRACT

The invention relates to an inverter circuit for the alternating connection of the phases of a three-phase load to a DC source, having pairs of electronic switches connected in parallel with one The two switches of each pair are connected in series, and wherein the connection for the respective phase of the load is provided at the connection of the two electronic switches belonging to the pair. An intermediate circuit capacitor is connected in parallel to the DC source. Electric connections are provided between the intermediate circuit capacitor and the power module for the connection of the switch pairs. The circuit arrangement has a buffer capacitor connected to a connection of the switch pairs. A first diode connects the buffer capacitor to the other
(Continued)

connection of the switch pairs. A step-down controller connects the buffer capacitor to the intermediate circuit capacitor.

16 Claims, 8 Drawing Sheets

(58) Field of Classification Search
CPC .... H02M 1/34–2001/348; H02M 1/42; H02M 7/42; H02M 7/44; H02M 7/53871
See application file for complete search history.

(56) References Cited

U.S. PATENT DOCUMENTS

| | | | | |
|---|---|---|---|---|
| 6,392,907 B1* | 5/2002 | Ichikawa | ............... | H02M 7/487 363/132 |
| 2010/0060246 A1* | 3/2010 | Babcock | ................ | H02P 7/281 323/225 |
| 2010/0328975 A1* | 12/2010 | Hibino | ................ | H02M 7/003 363/126 |
| 2011/0181993 A1* | 7/2011 | Yamaguchi | ........... | H02M 7/003 361/111 |
| 2013/0027984 A1 | 1/2013 | Takegami | | |
| 2016/0233811 A1* | 8/2016 | Sanada | ................ | H02P 27/047 |

FOREIGN PATENT DOCUMENTS

| | | |
|---|---|---|
| DE | 10020137 | 10/2001 |
| EP | 1213826 | 6/2002 |

* cited by examiner

INVERTER CIRCUIT COMPRISING A CIRCUIT ARRANGEMENT FOR REGENERATIVE DAMPING OF ELECTRICAL OSCILLATIONS, AND METHOD FOR REGENERATIVE DAMPING OF ELECTRICAL OSCILLATIONS

BACKGROUND OF THE INVENTION

The invention relates to an inverter circuit in which the energy is largely recovered in the electrical oscillations produced during switching operations, and also comprises a method for regeneratively damping electrical oscillations which is implemented with this inverter circuit.

Inverters convert a DC voltage provided by a source into an AC voltage of square-wave pulses of variable frequency which is then made available to a load, for example for operating an electrical machine, for instance for driving a motor for an electric vehicle.

Inverters are used in a single-phase and multi-phase form. In the case of a single-phase inverter, the outputs are alternately connected to the positive and negative pole of the source via switches. In the case of a multi-phase inverter, the polarity of the individual terminals of the load (phases) is reversed in a sequence which depends on the application. For example, a three-phase inverter can be used to cyclically reverse the polarity of three windings of a motor which are interconnected in star. In another example, a three-phase inverter can be used to cyclically reverse the polarity of three windings of a motor which are interconnected in delta.

FIG. 6 shows the basic circuit of a three-phase inverter according to the prior art. Here, the DC voltage is provided by a rechargeable battery and is made available at an intermediate circuit capacitor. Each of the three phases can be separately connected to the positive pole or the negative pole of the DC voltage via a respective semiconductor switch, MOSFETs or IGBTs each with diodes (freewheeling diodes) connected in parallel preferably being used as semiconductor switches. In this case, the two switches of each phase are operated in the push-pull mode, but with a certain dead time during switching in order to reliably avoid overlaps which would certainly signify a short circuit of the source.

At the moment of opening the semiconductor switches, the parasitic inductances of the circuit and here, in particular, the inductances of the connecting lines between the source with the intermediate circuit capacitor and the power module with the semiconductor switches become disruptively noticeable. This is because the energy stored in these parasitic inductances causes an induction voltage surge which results in overvoltages at the semiconductor switches and thus jeopardizes the power module and also results in electrical oscillations. In order to counter this, the prior art provides two different procedures which can also be combined: on the one hand, the electronic switches are designed from the outset for the expected overvoltages by virtue of their breakdown voltage being considerably above the intermediate circuit voltage. On the other hand, an additional capacitor can be connected to the semiconductor switches in a low-inductance manner ("capacitive snubber"), in which case "low-inductance" means that it should be integrated in the power module while minimizing the supply line lengths. In this case, an electrical oscillation is produced between this capacitor and the parasitic inductances, which oscillation is damped by the non-reactive resistors of the circuit (not illustrated in the figure) and decays. In both cases, the magnetic energy stored in the parasitic inductances is converted into heat during each switching operation and results in losses which increase in a manner proportional to the switching frequency.

SUMMARY OF THE INVENTION

In a first aspect, the invention relates to an inverter circuit for alternately connecting the phases of an n-phase, in particular a three-phase, load to the positive and negative pole of a DC voltage source, which circuit has pairs of electronic switches which are connected in parallel with one another and are integrated in a power module, the two switches belonging to the respective pair being connected in series, and the terminal for the respective phase of the load being provided at the connection of the two electronic switches belonging to the pair. The inverter circuit also has an intermediate circuit capacitor which is connected in parallel with the DC voltage source, and has electrical connections which run from the intermediate circuit capacitor to the power module and are used to connect the pairs of switches, these connections having distributed parasitic inductances and, as a result, causing electrical oscillations during switching. In order to damp these oscillations and recover the energy contained in them, the circuit arrangement comprises
 a buffer capacitor, the first terminal of which is connected to a terminal of the pairs of switches,
 a first diode, via which the other terminals of the buffer capacitor is connected to the other terminal of the pairs of switches,
 further diodes, via which the buffer capacitor is connected to the terminals for the respective phase of the load, and
 a buck converter, via which the buffer capacitor is connected to the intermediate circuit capacitor.

A further aspect of the invention is a method for recovering the energy contained in the magnetic field of the distributed parasitic inductances of a DC circuit, this DC circuit comprising a DC voltage source, an electronic switch and a load, having the following steps of
 opening the switch,
 supplying the induction voltage induced at the parasitic inductances by the switching to a buffer capacitor via a diode which is poled in such a manner that it prevents subsequent discharging of the buffer capacitor into the circuit, and
 discharging the buffer capacitor to the DC voltage source via a buck converter.

One advantage of the invention is that overvoltages at the electronic switches are avoided and the latter therefore do not need to be overdimensioned with regard to their dielectric strength. In addition, the energy contained in the parasitic inductances is recovered and is transmitted back to the intermediate circuit capacitor or to the voltage source. This considerably reduces the losses and the cooling performance required for this purpose in the power module, especially at high switching frequencies. EMC (electromagnetic compatibility) problems are also reduced. The switching frequency of the electronic switches can be increased as a result.

Embodiments of the invention provide further advantages:

If the buffer capacitor and the diodes are connected to the switches in a low-inductance manner, oscillations on account of parasitic inductances of the terminals of these components are reduced. This is particularly effective if they are integrated in the power module.

An additional damping capacitor which is connected in parallel with the pairs of switches and is connected to the latter in a low-inductance manner makes it possible to additionally damp oscillations, in particular in the case of switches which switch very quickly. This advantageously makes it possible to further increase the switching frequency.

The damping capacitor is preferably also integrated in the power module in order to avoid oscillations on account of parasitic inductances in its supply lines.

DETAILED DESCRIPTION

Figure 6:
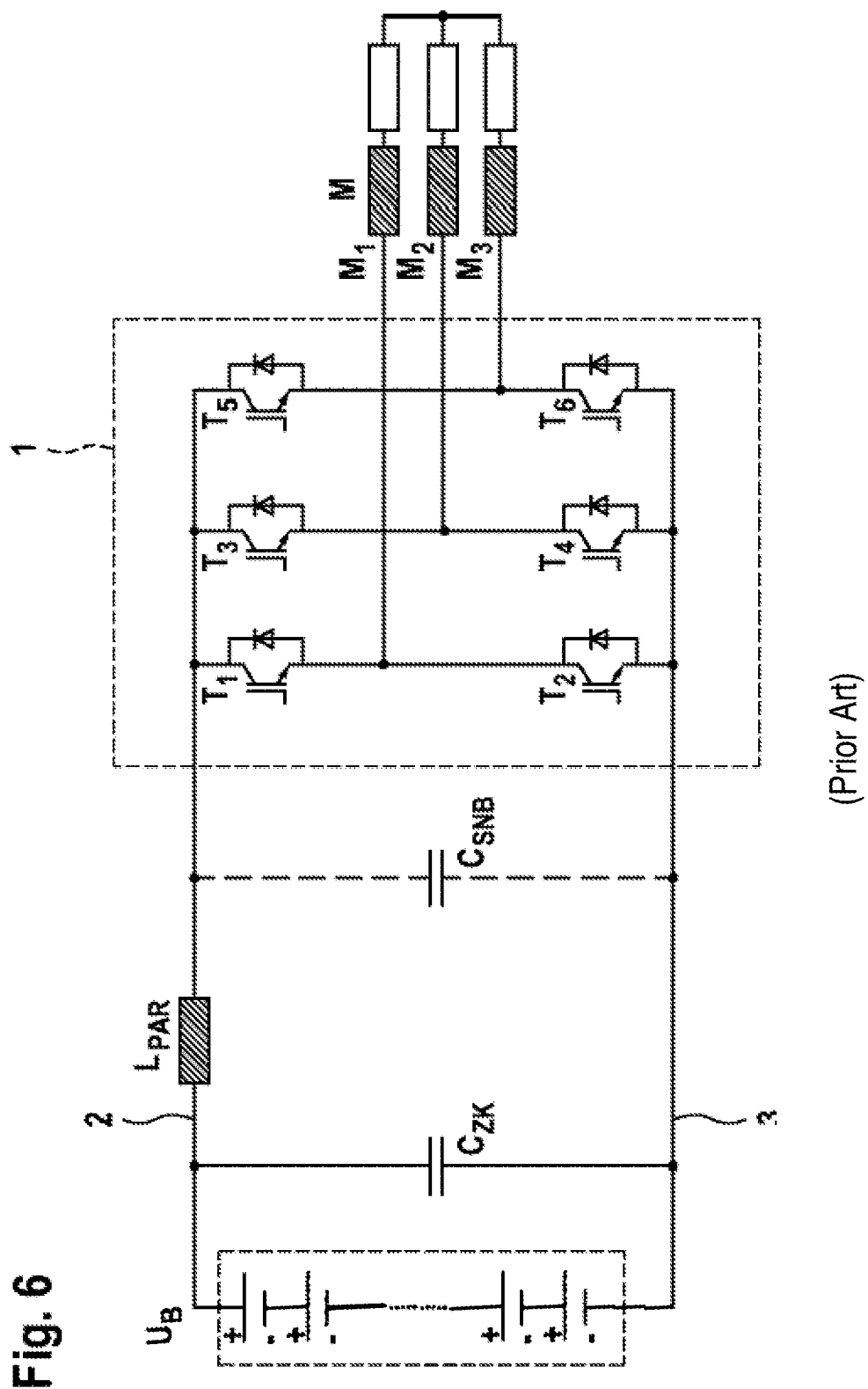
FIG. 6 shows an inverter circuit according to the prior art.

The invention is based on a three-phase inverter circuit, for example, according to FIG. 6 for alternately connecting the phases of a three-phase load M to the positive and negative pole of a DC voltage source $U_B$. For this purpose, the circuit has three pairs of electronic switches ($T_1$, $T_2$; $T_3$, $T_4$; $T_5$, $T_6$) which are connected in parallel with one another and are integrated in a power module 1, the two switches belonging to the respective pair being connected in series. The terminal for the respective phase ($M_1$, $M_2$, $M_3$) of the load M is provided at the respective connection of the two electronic switches belonging to the pair.

An intermediate circuit capacitor $C_{ZK}$ is connected in parallel with the DC voltage source $U_B$.

Figure 1:
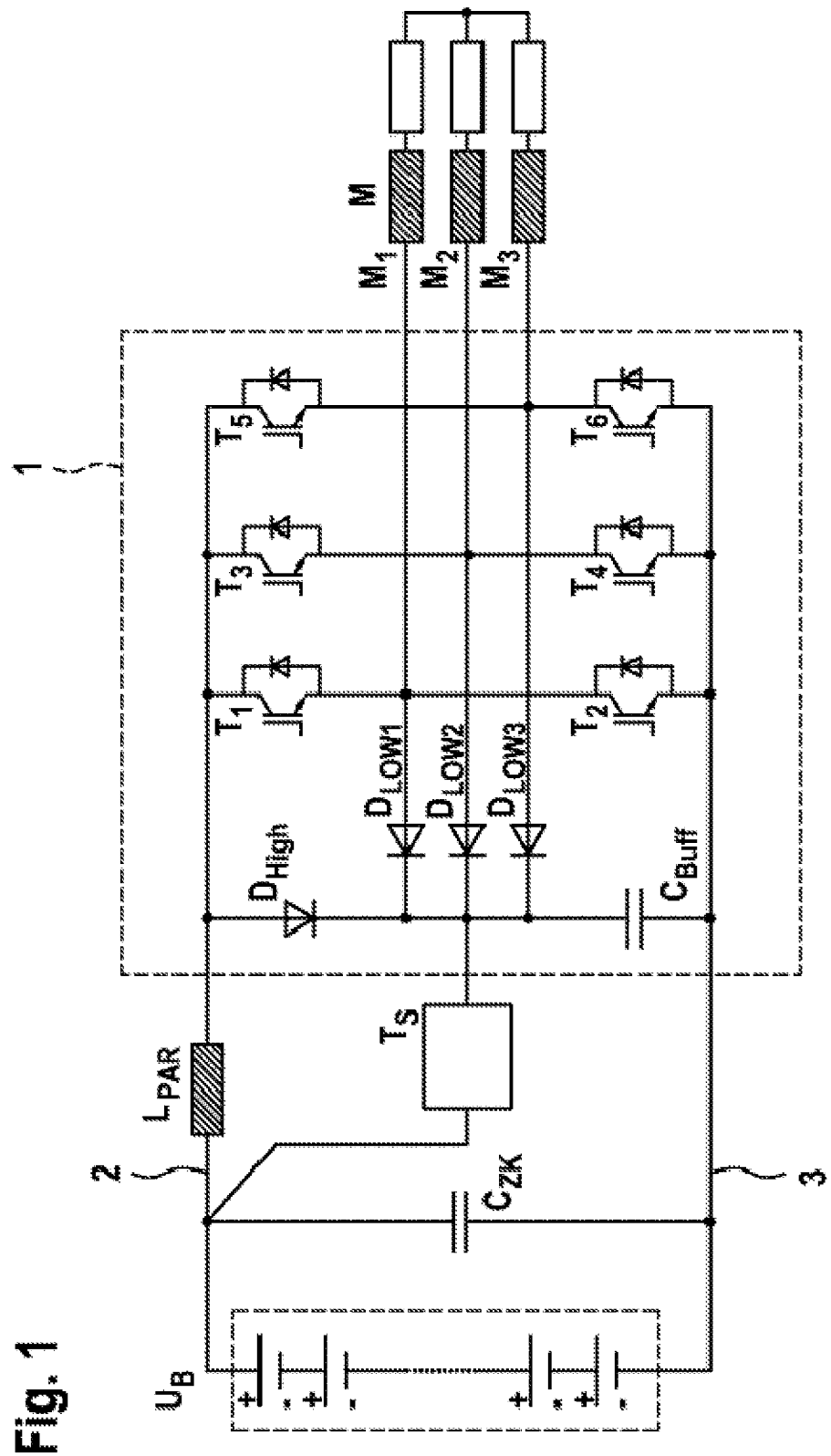
FIG. 1 shows a first embodiment of the invention.
Figure 3:
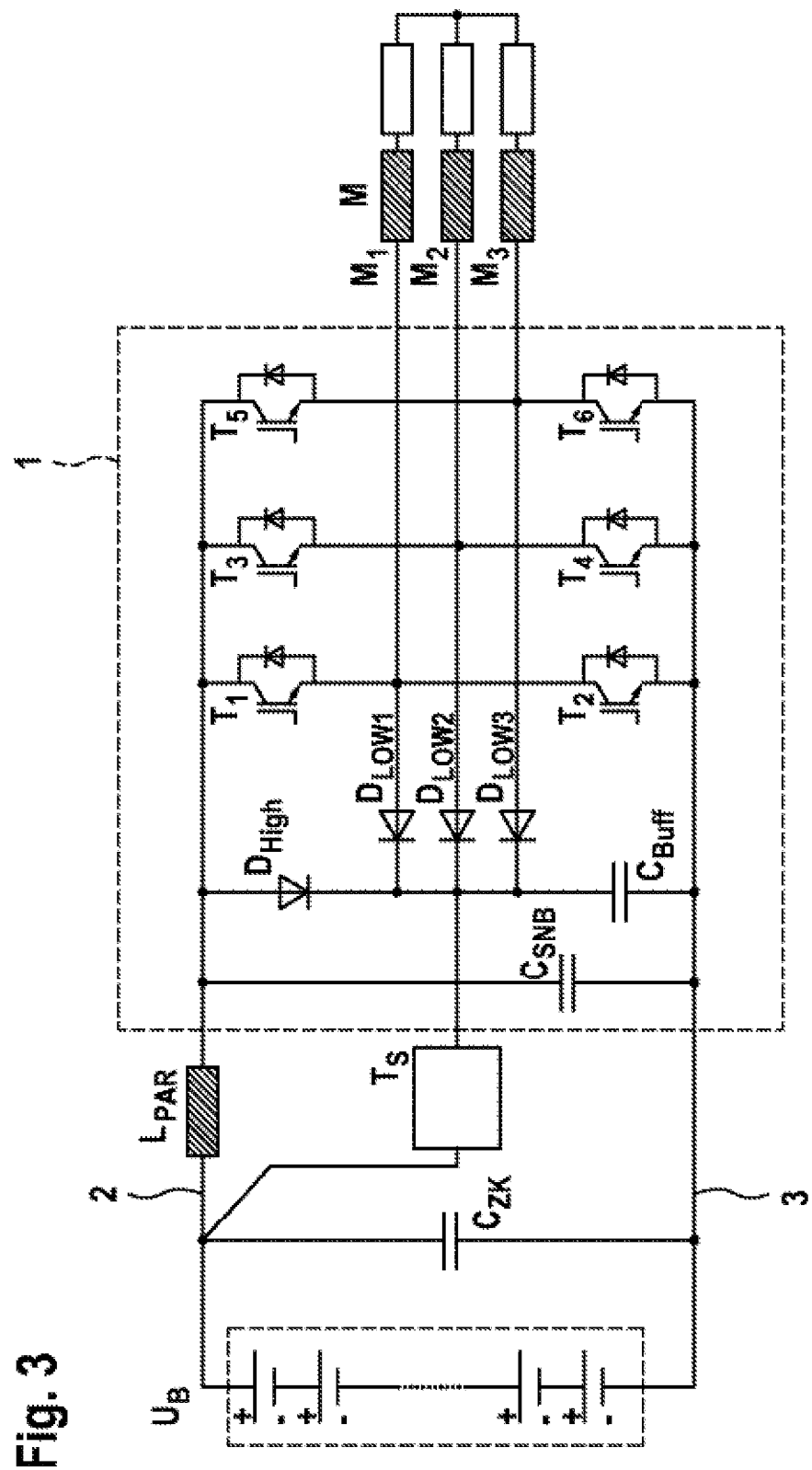
FIG. 3 shows a second embodiment of the invention with an additional snubber capacitor $C_{SNB}$.

The inverter circuit according to the invention in accordance with FIGS. 1 and 3 also has all of these components according to the prior art in accordance with FIG. 6.

The switches are actuated in such a manner that only at most one of the two switches belonging to a pair of switches is ever closed, as a result of which the associated phase of the load is connected either to the positive pole or to the negative pole of the DC voltage source.

In particular, the electrical connections 2 and 3 between the intermediate circuit capacitor $C_{ZK}$ and the power module 1 for connecting the pairs of switches ($T_1$, $T_2$; $T_3$, $T_4$; $T_5$, $T_6$) contain distributed parasitic inductances which are symbolically illustrated in FIG. 6 as a concentrated switching element $L_{PAR}$. When switching the electronic switches ($T_1$, $T_2$, $T_3$, $T_4$, $T_5$ and $T_6$), these inductances cause overvoltages and electrical oscillations. In the prior art, this is countered, on the one hand, by virtue of the fact that the switches are designed for the expected overvoltages by virtue of their breakdown voltage being considerably above the intermediate circuit voltage. On the other hand, an additional capacitor $C_{SNB}$ can be connected to the semiconductor in a low-inductance manner ("capacitive snubber"); this capacitor is depicted using dashed lines in FIG. 6. The energy contained in the oscillation is converted in this case in the unavoidable non-reactive resistors of the circuit (not illustrated in the drawing) into heat and must possibly be dissipated.

On the basis of this, FIG. 1 shows a first embodiment of the invention, identical components being denoted in an identical manner. The center of the circuit in this case contains the buffer capacitor $C_{Buff}$, the terminals (bottom of FIG. 1) of which are connected to the one terminal of the pairs of switches ($T_1$, $T_2$; $T_3$, $T_4$; $T_5$, $T_6$). The other terminal of the buffer capacitor is connected to the other terminal of the pairs of switches ($T_1$, $T_2$; $T_3$, $T_4$; $T_5$, $T_6$) via a first diode $D_{High}$ and is connected to the three terminals for the respective phase ($M_1$, $M_2$, $M_3$) of the load M via three further diodes ($D_{Low1}$, $D_{Low2}$, $D_{Low3}$). As a result, the voltage at the open switches is restricted to the intermediate circuit voltage, and the energy from the parasitic inductances $L_{PAR}$ is passed to the buffer capacitor $C_{Buff}$ and is buffered there.

This buffered energy is then removed from the buffer capacitor $C_{Buff}$ and is supplied to a buck converter $T_S$. Buck converters are known as such in the prior art and can be used here in any embodiment, for example as a conventional buck converter with active components and an explicit inductance. It would also be conceivable to recover energy via active components and parasitic inductances in construction and connection technology or via a completely passive network. The important factor is only that the higher voltage at the buffer capacitor $C_{Buff}$, which has received the energy from the parasitic inductances $L_{PAR}$, is reduced to the intermediate circuit voltage, with the result that this energy can be returned to the intermediate circuit capacitor $C_{ZK}$ and therefore to the source $U_B$. As a result, the overvoltages caused by the switching operation are reduced and there are only electrical oscillations with a greatly reduced amplitude.

Figure 2A:
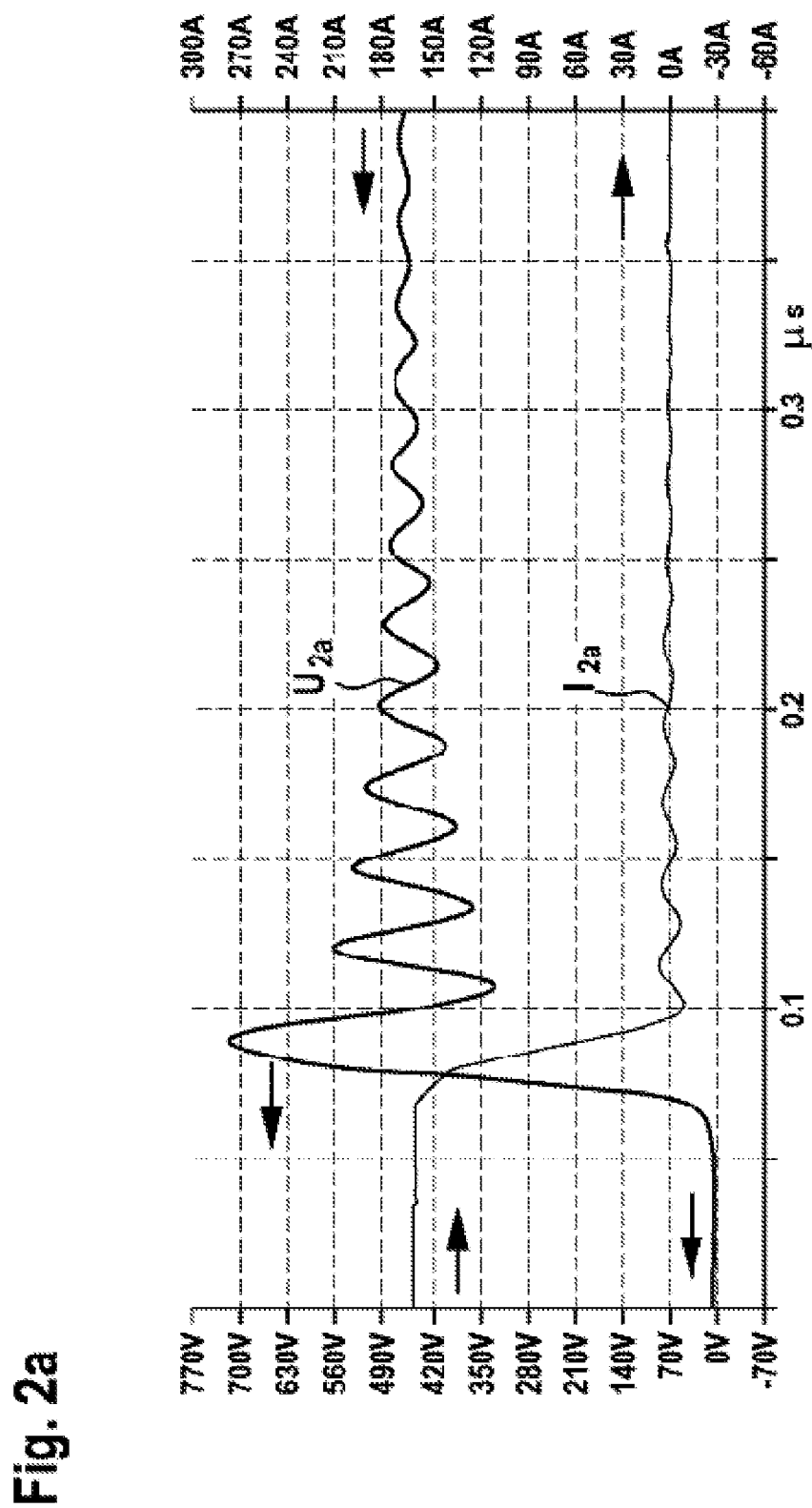
FIG. 2a shows simulation results for a circuit according to the prior art (FIG. 6)
Figure 2B:
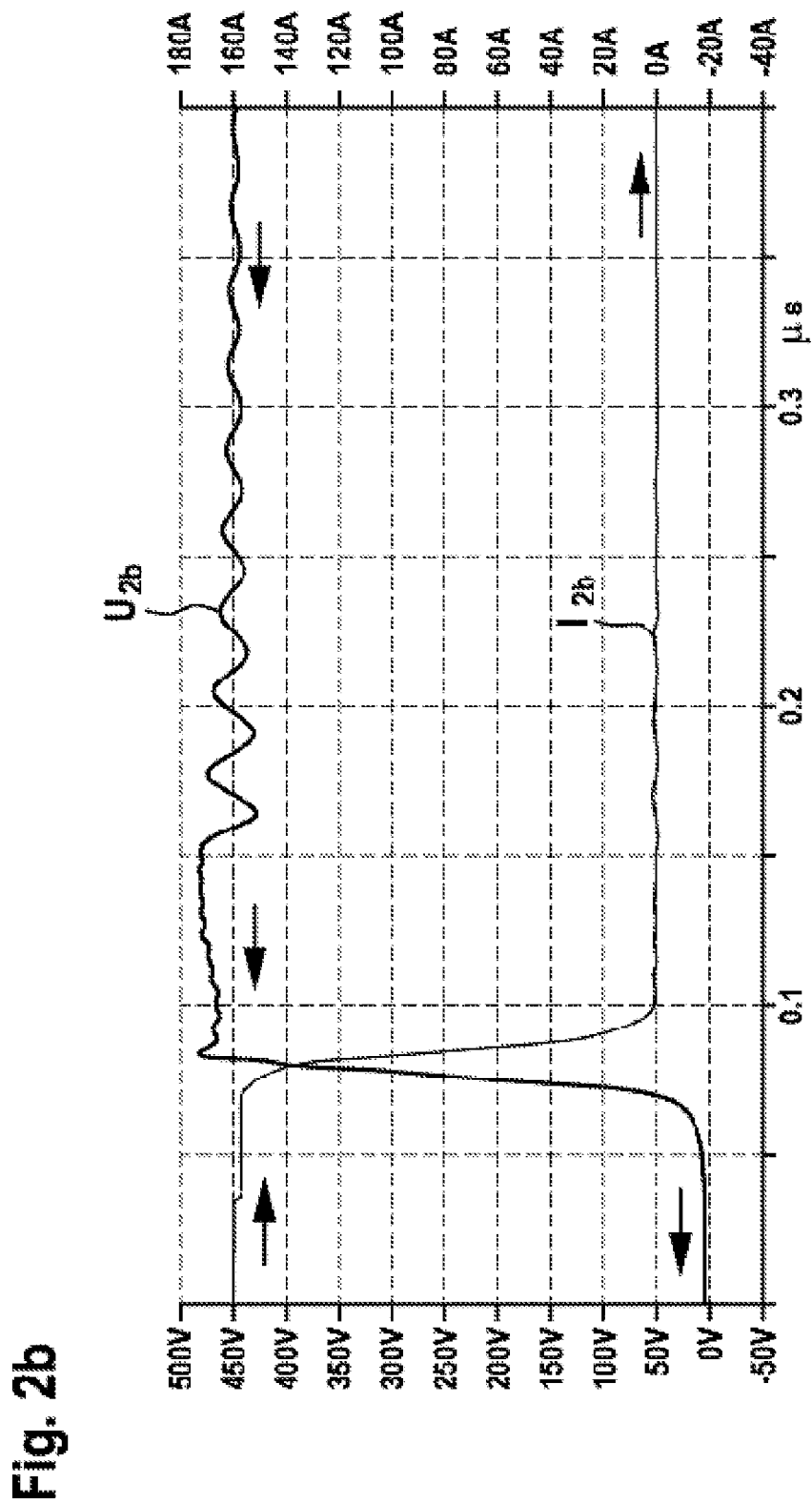
FIG. 2b shows simulation results for a circuit according to the invention in accordance with FIG. 1.

FIG. 2 shows this effect of the circuit according to the invention in the form of a simulation, in which case FIG. 2a illustrates the conditions before and FIG. 2b illustrates the conditions after the buffer capacitor $C_{Buff}$, the buck converter $T_S$ and the diodes have been inserted. In this case, the curves $I_{2a}$ and $I_{2b}$ show the current in the lines 2 and 3 and the curves $U_{1a}$ and $U_{1b}$ show the voltage at the input of the power module. In this case, the arrows refer to the respectively associated voltage ordinate (on the left) and current ordinate (on the right).

When implementing the circuit according to FIG. 1, it should be ensured that the parasitic inductances between the buffer capacitor $C_{Buff}$ and the electronic switches remain very low since otherwise undesirable further oscillations may result between these components. Therefore, in a first step, the diodes $D_{Low1}$, $D_{Low2}$ and $D_{Low3}$ in the power module 1 are intended to be integrated in the associated pairs of switches, that is to say $D_{Low1}$ in $T_1$ and $T_2$, $D_{Low2}$ in $T_3$ and $T_4$ and $D_{Low3}$ in $T_5$ and $T_6$, with the result that partial modules of the power module 1 are respectively formed. In a second integration step, the diode $D_{High}$ is also integrated in the power module 1 and the buffer capacitor $C_{Buff}$ is additionally integrated in a third step.

In contrast, parasitic inductances between $C_{Buff}$ and the intermediate circuit capacitor $C_{ZK}$—including the circuit of the buck converter—play a subordinate role because only the (low) current flows here for the purpose of feeding back the oscillation energy. These components and here, in particular, the circuit of the buck converter $T_S$ can therefore be arranged in a manner remote from the power module 1.

Figure 4A:
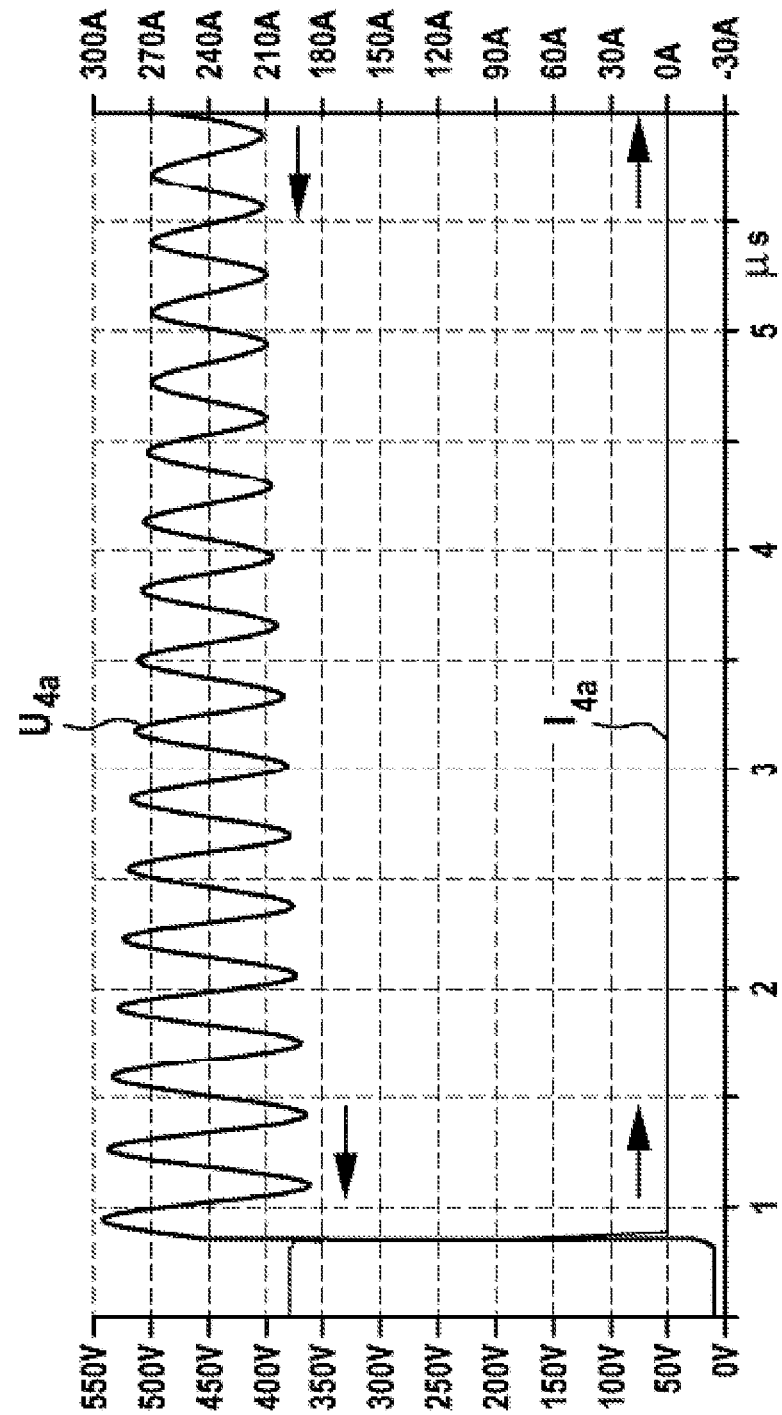
FIG. 4a shows simulation results for a circuit according to the prior art (FIG. 6) with an additional snubber capacitor $C_{SNB}$.

The circuit according to FIG. 1 can be supplemented with a snubber capacitor $C_{SNB}$, as is known per se from the prior art (shown using dashed lines in FIG. 6). This results in the embodiment of the invention according to FIG. 3. This arrangement is particularly advantageous in applications with semiconductors which switch in a particularly fast manner. In this respect, in a similar manner to FIG. 2, FIG. 4 again shows the simulation results before and after inserting the oscillation damping with the buffer capacitor $C_{Buff}$, buck converter $T_S$ and diodes.

It can be gathered from the curves that an undamped oscillation (FIG. 2a, curve $U_{2a}$) achieves a maximum overvoltage of (in this example) more than 250 V above the operating voltage of 450 V, and a snubber capacitor according to the prior art (FIG. 4a, curve $U_{4a}$) can reduce this amplitude to approximately 100 V.

Figure 4B:
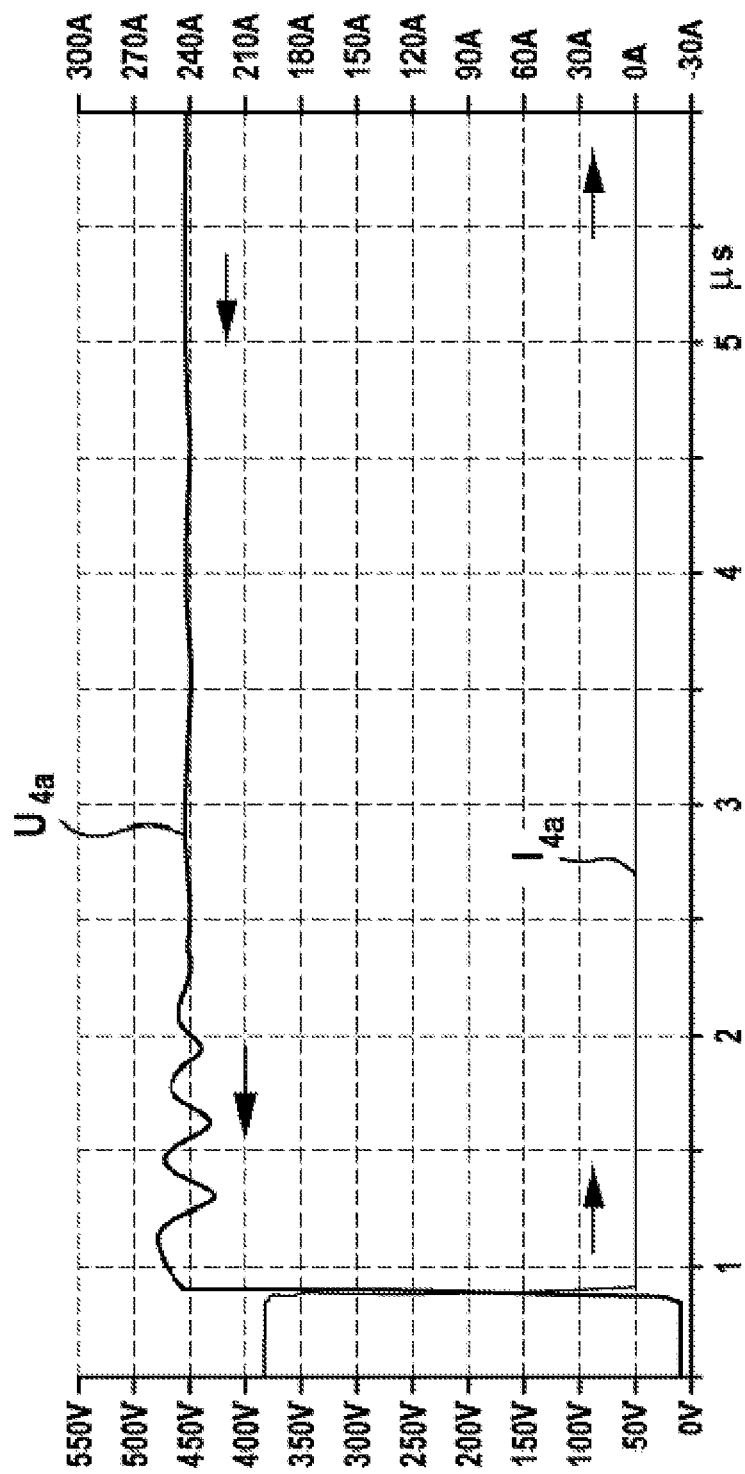
FIG. 4b shows simulation results for a circuit according to the invention with an additional snubber capacitor $C_{SNB}$ in accordance with FIG. 3.

With the regenerative damping according to the invention, the overvoltage can be reduced to approximately 25 V (FIG. 2b, curve $U_{2b}$, and FIG. 4b, curve $U_{4b}$). In this case, it is shown that, in the circuit according to the invention, the frequency of the remaining oscillation falls from approximately 30 MHz (FIG. 2b, curve $U_{2b}$, without a snubber capacitor) to approximately 3 MHz (FIG. 4b, curve $U_{4b}$, with a snubber capacitor) as a result of the additional snubber capacitor $C_{SNB}$. The snubber capacitor $C_{SNB}$ which is known per se therefore has a different focal point of activity in connection with the invention than in the prior art.

The invention was explained here on the basis of a three-phase load M. However, it can readily also be used in a multi-phase load, for example a six-phase or nine-phase load M. In one embodiment, the inverter circuit is connected to a three-phase motor having its windings interconnected in star. In another embodiment, the windings of the motor are interconnected in delta. In one embodiment, the DC voltage source is a rechargeable battery for the drive of an electric vehicle.

However, in the case of a load referred to as "single-phase", it does not suffice to alternately connect one of the two terminals of the load to the positive and negative pole of the DC voltage source ($U_B$). Rather, this must take place with both terminals of the load, with the result that the two terminals of the load can be understood as meaning phases in the sense of claim 1. Therefore, two pairs of switches etc. are also used in this case.

Figure 5:
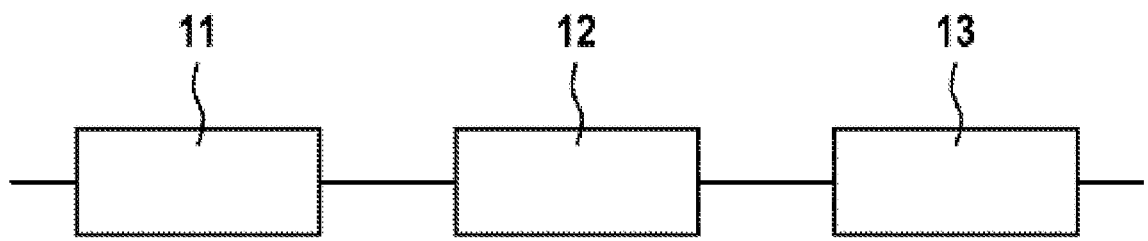
FIG. 5 symbolically shows the general method for recovering the energy from electrical oscillations.

FIG. 5 symbolically shows the general method for recovering energy contained in the magnetic field of the distributed parasitic inductances of a DC circuit. In this case, it is assumed that this DC circuit comprises a DC voltage source, an electronic switch and a load which are connected to one another via lines having parasitic inductances, and the method has the following steps of:

opening (11) the switch, as a result of which the circuit is interrupted and the energy stored in the parasitic inductances induces an induction voltage;

supplying (12) this induction voltage induced by the switching to a buffer capacitor via a diode which is poled in such a manner that it prevents subsequent discharging of the buffer capacitor into the circuit, and discharging (13) the buffer capacitor to the DC voltage source via a buck converter.

The invention claimed is:

1. An inverter circuit for alternately connecting the phases of a single-phase or multi-phase load (M) to the positive and negative pole of a DC voltage source ($U_B$), the inverter circuit comprising:

pairs of electronic switches ($T_1$, $T_2$; $T_3$, $T_4$; $T_5$, $T_6$; . . . ) which are connected in parallel with one another and are integrated in a power module (1), each switch of each respective pair of electronic switches being connected in series, and the terminal for the respective phase ($M_1$, $M_2$, $M_3$; . . . ) of the load (M) being provided at the connection of the two electronic switches belonging to the pair, an intermediate circuit capacitor ($C_{ZK}$) which is connected in parallel with the DC voltage source ($U_B$), and electrical connections (2, 3) between the intermediate circuit capacitor ($C_{ZK}$) and the power module (1) for connecting the pairs of switches ($T_1$, $T_2$; $T_3$, $T_4$; $T_5$, $T_6$; . . . ), the electrical connections (2, 3) having distributed parasitic inductances ($L_{PAR}$) and, as a result, causing electrical oscillations during switching; and a circuit arrangement for regeneratively damping the electrical oscillations, having a buffer capacitor ($C_{Buff}$), the first terminal of which is connected to a terminal of the pairs of switches ($T_1$, $T_2$; $T_3$, $T_4$; $T_5$, $T_6$; . . . ), a single first diode ($D_{High}$), directly connected to a second terminal of the buffer capacitor ($C_{Buff}$) and directly connected to the other terminal of the pairs of electronic switches ($T_1$, $T_2$; $T_3$, $T_4$; $T_5$, $T_6$; . . . ), further diodes ($D_{Low1}$, $D_{Low2}$, $D_{Low3}$; . . . ), connected between the second terminal of the buffer capacitor ($C_{Buff}$) and the single first diode, and connected to the terminals for the respective phase ($M_1$, $M_2$, $M_3$; . . . ) of the load (M) in a blocking direction, and a buck converter ($T_S$), via which the buffer capacitor ($C_{Buff}$) is connected to the intermediate circuit capacitor ($C_{ZK}$).

2. The inverter circuit as claimed in claim 1 for alternately connecting phases of a three-phase load (M) to positive and negative pole of a DC voltage source ($U_B$) comprising three pairs of electronic switches ($T_1$, $T_2$; $T_3$, $T_4$; $T_5$, $T_6$) which are connected in parallel with one another and are integrated in a power module (1), the two electronic switches belonging to the respective pair being connected in series, and the terminal for the respective phase ($M_1$, $M_2$, $M_3$) of the load (M) being provided at a connection of the two electronic switches belonging to the pair, an intermediate circuit capacitor ($C_{ZK}$) which is connected in parallel with the DC voltage source ($U_B$), and electrical connections (2, 3) between the intermediate circuit capacitor ($C_{ZK}$) and the power module (1) for connecting the pairs of switches ($T_1$, $T_2$; $T_3$, $T_4$; $T_5$, $T_6$), the electrical connections (2, 3) having distributed parasitic inductances ($L_{PAR}$) and, as a result, causing electrical oscillations during switching; and a circuit arrangement for regeneratively damping the electrical oscillations, having a buffer capacitor ($C_{Buff}$), a first terminal of which is connected to a terminal of the pairs of switches ($T_1$, $T_2$; $T_3$, $T_4$; $T_5$, $T_6$), a single first diode ($D_{High}$), directly connected to a second terminal of the buffer capacitor ($C_{Buff}$) and directly connected to the other terminal of the pairs of electronic switches ($T_1$, $T_2$; $T_3$, $T_4$; $T_5$, $T_6$), three further diodes ($D_{Low1}$, $D_{Low2}$, $D_{Low3}$), connected between the second terminal of the buffer capacitor ($C_{Buff}$) and the single first diode, and connected to the three terminals for the respective phase ($M_1$, $M_2$, $M_3$) of the load (M) in a blocking direction, and a buck converter ($T_S$), via which the buffer capacitor ($C_{Buff}$) is connected to the intermediate circuit capacitor ($C_{ZK}$).

3. The inverter circuit as claimed in claim 1, in which the further diodes ($D_{High}$ and $D_{Low1}$, $D_{Low2}$, $D_{Low3}$; ...) and the buffer capacitor ($C_{Buff}$) are connected to the pair of electronic switches ($T_1$, $T_2$; $T_3$, $T_4$; $T_5$, $T_6$; ...) in a low-inductance manner.

4. The inverter circuit as claimed in claim 3, in which the further diodes ($D_{Low1}$, $D_{Low2}$, $D_{Low3}$; ...) in the power module (1) are integrated in the associated pair of switches ($T_1$, $T_2$; $T_3$, $T_4$; $T_5$, $T_6$; ...).

5. The inverter circuit as claimed in claim 3, in which the further diodes ($D_{High}$ and $D_{Low1}$, $D_{Low2}$, $D_{Low3}$; ...) are integrated in the power module (1).

6. The inverter circuit as claimed in claim 3, in which the further diodes ($D_{High}$ and $D_{Low1}$, $D_{Low2}$, $D_{Low3}$; ...) and the buffer capacitor ($C_{Buff}$) are integrated in the power module (1).

7. The inverter circuit as claimed in claim 1, having a damping capacitor ($C_{SNB}$) which is connected in parallel with the pairs of electronic switches ($T_1$, $T_2$; $T_3$, $T_4$; $T_5$, $T_6$; ...) and is connected to the latter in a low-inductance manner.

8. The inverter circuit as claimed in claim 7, in which the damping capacitor ($C_{SNB}$) is integrated in the power module (1).

9. The inverter circuit as claimed in claim 1, in which the DC voltage source ($U_B$) is a rechargeable battery for the drive of an electric vehicle.

10. The inverter circuit as claimed in claim 1, in which the load (M) is a three-phase electric motor and its windings are interconnected in star.

11. The inverter circuit as claimed in claim 1, in which the load (M) is a three-phase electric motor and its windings are interconnected in delta.

12. A method for recovering the energy contained in the magnetic field of the distributed parasitic inductances of a DC circuit, this DC circuit comprising:
   a DC voltage source having positive and negative poles,
   a single-phase or multi-phase load,
   an inverter circuit comprising:
      pairs of electronic switches which are connected in parallel with one another and integrated in a power module, each electronic switch of each of the respective pair of electronic switches being connected in series,
      an intermediate circuit capacitor connected in parallel with the DC voltage source, and
      electrical connections between the intermediate circuit capacitor and the power module for connecting the pairs of electronic switches, the electrical connections having distributed parasitic inductances and as a result, causing electrical oscillations during switching, and
   a circuit arrangement for regeneratively damping the electrical oscillations including:
      a buffer capacitor having a first terminal connected to a terminal of the pairs of electronic switches,
      a first diode directly connected to a second terminal of the buffer capacitor and directly connected to the other terminal of the pairs of electronic switches,
      further diodes connected between the second terminal of the buffer capacitor and the first diode, and connected to the terminals for the respective phase of the load in a blocking direction, and
      a buck converter, via which the buffer capacitor is connected to the intermediate circuit capacitor,
   the method having the following steps of
   opening (11) the pairs of electronic switches,
   supplying (12) the induction voltage, induced at the parasitic inductances by the opening of the pairs of electronic switches to the buffer capacitor via the further diodes which are poled in such a manner to prevent subsequent discharging of the buffer capacitor into the load, and
   discharging (13) the buffer capacitor to the DC voltage source via a buck converter.

13. The inverter circuit as claimed in claim 2, wherein the first terminal of the buffer capacitor ($C_{Buff}$) is directly connected to the terminal of the pairs of electronic switches ($T_1$, $T_2$; $T_3$, $T_4$; $T_5$, $T_6$).

14. The inverter circuit as claimed in claim 1, wherein the first terminal of the buffer capacitor ($C_{Buff}$) is directly connected to the terminal of the pairs of electronic switches ($T_1$, $T_2$; $T_3$, $T_4$; $T_5$, $T_6$; ...).

15. The method as claimed in claim 12, wherein the first terminal of the buffer capacitor is directly connected to the terminal of each of the pairs of electronic switches.

16. The method as claimed in claim 15, wherein the first diode is a single first diode.

* * * * *